US012792237B2

(12) United States Patent
Yan

(10) Patent No.: US 12,792,237 B2
(45) Date of Patent: Nov. 10, 2026

(54) FLASH TRANSLATION APPARATUS AND STORAGE METHOD

(71) Applicant: SAMSUNG ELECTRONICS CO., LTD., Suwon-si (KR)

(72) Inventor: Hao Yan, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/894,609

(22) Filed: Sep. 24, 2024

(65) Prior Publication Data

US 2026/0044273 A1 Feb. 12, 2026

(30) Foreign Application Priority Data

Aug. 12, 2024 (CN) ........................ 202411103218.X

(51) Int. Cl.
*G06F 3/00* (2006.01)
*G06F 3/06* (2006.01)

(52) U.S. Cl.
CPC .......... *G06F 3/0631* (2013.01); *G06F 3/0604* (2013.01); *G06F 3/0659* (2013.01); *G06F 3/0679* (2013.01)

(58) Field of Classification Search
CPC .... G06F 3/0631; G06F 3/0604; G06F 3/0659; G06F 3/0679
See application file for complete search history.

(56) References Cited

U.S. PATENT DOCUMENTS 5,357,614 A * 10/1994 Pattisam ................ H03M 7/30 711/138
10,496,312 B2 12/2019 Lee
11,263,147 B2 3/2022 Miura
2009/0177853 A1* 7/2009 Mazzola ............ G06F 12/0292 711/158
2010/0017578 A1* 1/2010 Mansson ............ G06F 12/1009 711/E12.001
2012/0084531 A1* 4/2012 Funk ...................... G06F 12/08 711/E12.001
2013/0246891 A1* 9/2013 Manning .............. G06F 3/0619 714/752
2014/0281168 A1* 9/2014 Koseki ................. G06F 3/0653 711/103
2018/0365191 A1* 12/2018 Byzov .................. G06F 9/4856
2019/0294345 A1 9/2019 Yu et al.
2020/0310675 A1 10/2020 Cho
2022/0058136 A1* 2/2022 Li ...................... G06F 12/0253

FOREIGN PATENT DOCUMENTS

KR 10-1752304 B1 6/2017

* cited by examiner

*Primary Examiner* — Craig S Goldschmidt
(74) *Attorney, Agent, or Firm* — Sughrue Mion, PLLC

(57) ABSTRACT

A storage device is provided. The storage device includes: a nonvolatile memory device configured to provide a physical address space; and at least one processor configured to implement: a flexible mapper configured to: obtain a size of compressed data in a logical page of a logical address space, the compressed data being obtained by compressing raw data; and determine, based on the size of the compressed data, a number of physical pages of the physical address space for storing the compressed data; a physical page manager configured to allocate physical pages corresponding to the number of physical pages; and a write controller configured to write data to the physical pages allocated by the physical page manager.

20 Claims, 20 Drawing Sheets

FLASH TRANSLATION APPARATUS AND STORAGE METHOD

CROSS-REFERENCE TO RELATED APPLICATION

This application is based on and claims priority under 35 U.S.C. § 119 to Chinese Patent Application No. 202411103218.X, filed on Aug. 12, 2024, in the China National Intellectual Property Administration, the disclosure of which is incorporated by reference herein in its entirety.

TECHNICAL FIELD

The disclosure relates to a flash translation apparatus, a storage method, a storage system, a host storage system, a data center system, a computer readable storage media and an electronic device.

BACKGROUND

Computer and network systems (e.g., a data storage system, a server system, a cloud storage system, a personal computer and a workstation) typically include data storage devices for storing and retrieving data. These data storage devices may include a hard disk drive, a solid state drive, a tape storage device, an optical storage drive, a hybrid storage device including rotating and solid state data storage elements, and other mass storage devices.

The computer and network systems increase in number and capacity, but the data storage devices may have limited internal resources.

SUMMARY

According to an aspect of an example embodiment, a storage device includes: a nonvolatile memory device configured to provide a physical address space; and at least one processor configured to implement: a flexible mapper configured to: obtain a size of compressed data in a logical page of a logical address space, the compressed data being obtained by compressing raw data; and determine, based on the size of the compressed data, a number of physical pages of the physical address space for storing the compressed data; a physical page manager configured to allocate physical pages corresponding to the number of physical pages; and a write controller configured to write data to the physical pages allocated by the physical page manager.

According to another aspect of an example embodiment, a storage method includes: obtaining a size of compressed data in a logical page of a logical address space, the compressed data being obtained by compressing raw data; determining, based on the size of the compressed data, a number of physical pages of a physical address space provided by a nonvolatile memory device for storing the compressed data; allocating physical pages corresponding to the number of physical pages; and writing data to the physical pages allocated by the physical page manager.

According to an aspect of an example embodiment, a non-transitory computer readable storage medium has a computer program stored thereon, wherein the computer program, when executed by a processor, is configured to control a storage device to perform a method including: obtaining a size of compressed data in a logical page of a logical address space, the compressed data being obtained by compressing raw data; determining, based on the size of the compressed data, a number of physical pages of a physical address space provided by a nonvolatile memory device for storing the compressed data; allocating physical pages corresponding to the number of physical pages; and writing data to the physical pages allocated by the physical page manager.

BRIEF DESCRIPTION OF DRAWINGS

The above and other aspects will be more apparent from the following description of example embodiments, taken in conjunction with the accompanying drawings, in which.

DETAILED DESCRIPTION

Figure 1:
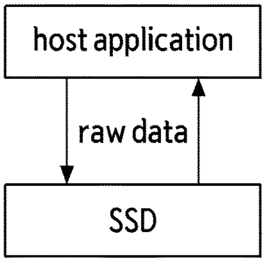
FIG. 1 illustrates a data access process without a data compression function.

Hereinafter, example embodiments are described in detail with reference to the accompanying drawings. Like components are denoted by like reference numerals throughout the specification, and repeated descriptions thereof are omitted.

It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. Embodiments described herein are example embodiments, and thus, the present disclosure is not limited thereto, and may be realized in various other forms. Each example embodiment provided in the following description is not excluded from being associated with one or more features of another example or another example embodiment also provided herein or not provided herein but consistent with the present disclosure.

The following description with reference to the accompanying drawings is provided to assist in a comprehensive understanding of various example embodiments as defined by the claims and their equivalents. It includes various specific details to assist in that understanding but these are provided as examples. Accordingly, those of ordinary skill in the art will recognize that various changes and modifications of various example embodiments described herein may be made without departing from the scope and spirit. In addition, descriptions of well-known functions and constructions may be omitted for clarity and conciseness.

It is to be understood that the singular forms "a," "an," and "the" may also include plural referents unless the context clearly dictates otherwise. Thus, for example, reference to "a component surface" includes reference to one or more of such surfaces. When one element is referred to be "connected" or "coupled" to another element, the one element may be directly connected or coupled to the another element, or it may mean that the one element and the another element are connected through an intermediate element. Furthermore, "connected" or "coupled" as used herein may include wirelessly connected or wirelessly coupled.

The term "include" or "may include" refers to the existence of a corresponding disclosed function, operation or component which may be used in various embodiments and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used herein includes any or all of combinations of listed words. For example, the expression "A or B" may include A, may include B, or may include both A and B. When a plurality (two or more) of items are described, if a relationship between the plurality of items is not explicitly defined, the plurality of items may refer to one, more, or all of the plurality of items, e.g., for a description of "a parameter A includes A1, A2, A3", the description may be realized as the parameter A includes A1 or A2 or A3, or as the parameter A includes at least two of A1, A2, and A3 . . . .

Example embodiments provide a flash translation apparatus and a storage method, wherein the flash translation apparatus enables flexible dynamic granularity mapping between a logical space for raw data and a physical space used by a storage device, and manages a mapping table between a logical address and a physical address by using less memory of the storage device, enabling more user data to be stored. According to example embodiments, the flash translation apparatus may be implemented by a flash translation layer (FTL).

For ease of understanding, related data access schemes are first described with reference to FIGS. 1 through 4. FIG. 1 illustrates a data access process without a data compression function.

Referring to FIG. 1, raw data of a host application is stored directly into a solid-state drive (SSD). This allows for fastest data storage performance and read performance. However, as a data compression function is not performed, the SSD may only store raw data that is the same size as a physical storage space of the SSD.

Figure 2:
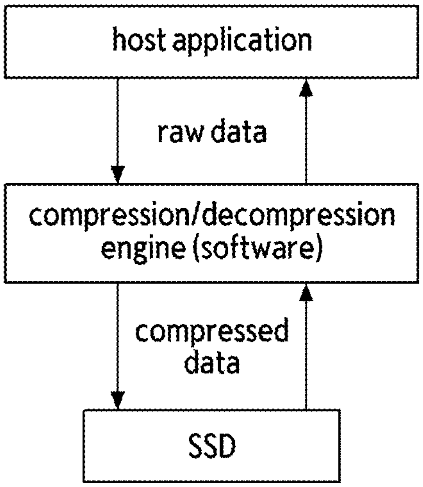
FIG. 2 illustrates a data access process that integrates software of a data compression function in host software.

FIG. 2 illustrates a data access process in which software of a data compression function is integrated in host software.

Referring to FIG. 2, in a case of integrating a software data compression/decompression engine in a host/system software, a host application invokes the data compression engine to compress data before storing the data to an SSD, after which the compressed data is stored in the SSD. When reading the data, the compressed data is first read from the SSD, and then the data decompression engine is invoked to decompress the compressed data, and the resulting raw data is passed to an application software for use.

This scheme may store more data to be stored in the SSD. However, the scheme will require additional host computing power and reduce the performance of data access at the same time because of the data compression and decompression.

Figure 3:
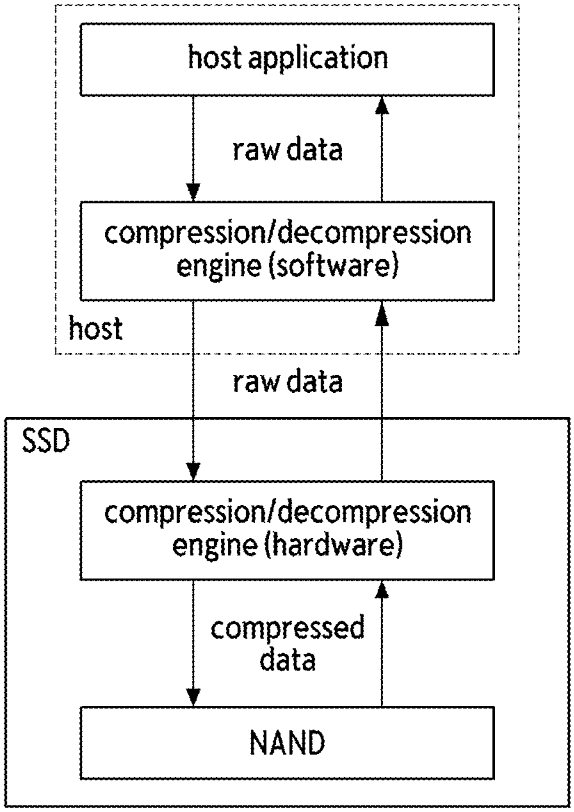
FIG. 3 illustrates a data access process that integrates hardware of a data compression function in a solid-state drive (SSD)

FIG. 3 illustrates a data access process that integrates hardware of a data compression function in an SSD.

Referring to FIG. 3, a data compression and decompression engine implemented by hardware is integrated inside an SSD. When a host writes data, the host provides raw data directly to the SSD, and after receiving the raw data, the SSD compresses the data through a hardware data compression engine, writes the compressed data to a NAND storage medium, and returns an actual storage address and a size of the compressed data (a compressed data size) to the host. When the host reads the data, the host first identifies the storage address and the size of the corresponding compressed data on the SSD through a raw data-compressed data mapping management module, and then transmits a data read command indicating the storage address and the size to the SSD. When the SSD receives the data read command, the SSD reads out the compressed data from the storage address carried by the read command, invokes the data decompression engine to decompress the data, and returns the decompressed data to the host.

This scheme reduces an increase in the computing power of the host and ensures the performance of data access. However, because the sizes of the raw data and the compressed data (the raw data size and the compressed data size) are different, the address and the size of the raw data are not consistent with those of the compressed data. Specifically, the address of the raw data may refer to a logical address of the raw data in the SSD as seen by a host side. Because the raw data is compressed, the amount of data becomes smaller, resulting in inconsistency in the required storage space. Because transparent compression is used, the decompressed data seen at the host side is much larger than the compressed data. For example, if it is assumed that a compression rate is 50% and a logical storage space seen at the host side is 100, an actual logical space provided by the SSD may be 50, which leads to inconsistency in the sizes and the logical addresses of the raw data and compressed data. Therefore, mapping management between the raw data and compressed data needs to be performed at the host side, which occupies a large amount of host memory and introduces consistency requirements for the mapping management.

Figure 4:
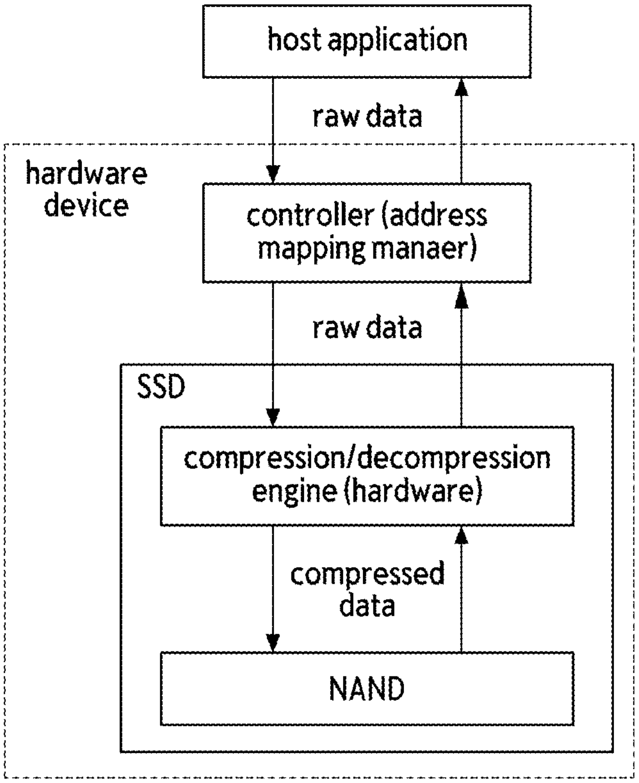
FIG. 4 illustrates a data access process that integrates hardware of a data compression function in an SSD and adds an additional mapping management controller between the SSD and a host.

FIG. 4 illustrates a data access process that integrates hardware of a data compression function in an SSD and adds an additional mapping management controller between the SSD and a host.

Referring to FIG. 4, in addition to integration of hardware of a data compression function in an SSD as shown in FIG. 3, a raw data-compressed data mapping management module, which is implemented in software at a host side, is decentralized to a dedicated controller. This scheme reduces the use of a host memory. However, the introduction of the controller still requires the same size of memory as the scheme shown in FIG. 3, and additional logic needs to be introduced for persistent management for mapping data of raw data-compressed data.

Based on the above description of the data access processes for the SSD, regarding the scheme shown in FIG. 1 there is a technical need to store less user data, regarding the scheme shown in FIG. 2 there is a technical need to require fewer host computing resources, improve poor read/write performance and operate without modifying the host software needing, and regarding the scheme shown in FIG. 3 there is a technical need to require reduced memory resources (the host or additional hardware) and operate without modifying the host software. Regarding the scheme shown in FIG. 4, there is a need to require reduced memory resources (the host or additional hardware).

Therefore, in order for the SSD to provide a true full-transparent data compression function without introducing additional software and hardware resources (e.g., computing resources, memory resources, additional hardware resources, etc.), and for enabling users to use the data compression function of the SSD without any additional modifications (e.g., software development modifications at the host side, and additional hardware), to achieve the goal of storing more data on a same physical storage medium, an SSD FTL implementation scheme that simultaneously implements raw data-compressed data mapping and logical address-physical address mapping is provided to enable users to seamlessly switch between a normal SSD and an SSD with data compression characteristics; use less SSD memory to manage an address mapping table to reduce SSD complexity; and store more user data on a NAND storage space with a same size. The SSD FTL scheme may be referred to as a Flexible FTL (F-FTL). A workflow of the F-FTL according to example embodiments is described in detail below.

Example embodiments provide a flexible dynamic granularity mapping between a logical space of raw data and a physical space used by an SSD. An access granularity of an application at a host side is a Logical Page (LP); and an access granularity of a NAND on an SSD side is a Physical Page (PP). According to example embodiments, a logical page size (a size of a logical page) may be set as a power multiple of a physical page size (a size of a physical page). For example, the logical page size is $S_{LP}$, the physical page size is $S_{PP}$, and the logical page size is an Nth power of 2 of the physical page size, i.e.:

$$S_{LP} = 2^N * S_{PP}$$

Figure 5:
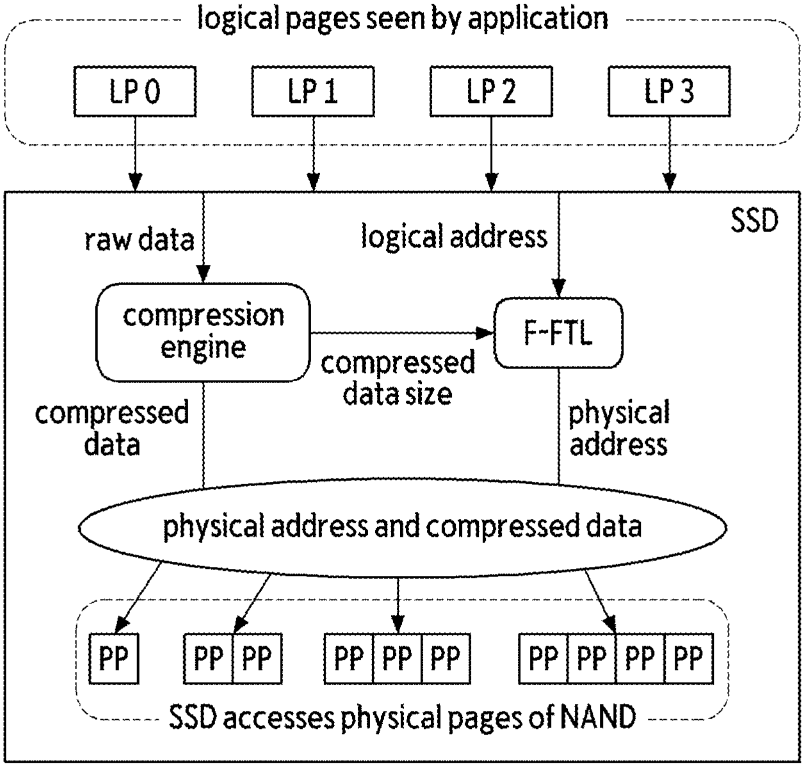
FIG. 5 illustrates a schematic diagram of mapping a logical page to physical page according to an example embodiment.

As shown in FIG. 5, when N is 2, i.e., the logical page size is 4 times the physical page size, and depending on sizes of different compressed data, a logical page may be mapped by the F-FTL to 1, 2, 3, or 4 consecutive physical pages. The above is provided as an example, and example embodiments are not limited thereto.

There are two basic concepts in the use of the SSD, a Logical Page Number (LPN) and a Physical Page Number (PPN).

Figure 6:
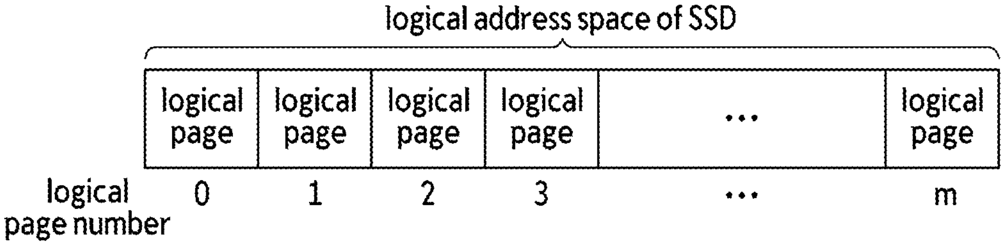
FIG. 6 illustrates a schematic diagram of a logical address space according to an example embodiment.

The LPN represents an address of a logical page. A storage space of the SSD seen by a host application is a logical address space, which is divided equally into fixed-sized and consecutive logical pages. A position index of a logical page in the logical address space is the LPN, as shown in FIG. 6.

The PPN represents an address of a physical page. The PPN may be used to identify a position of a NAND physical page in a NAND storage array.

Figure 7:
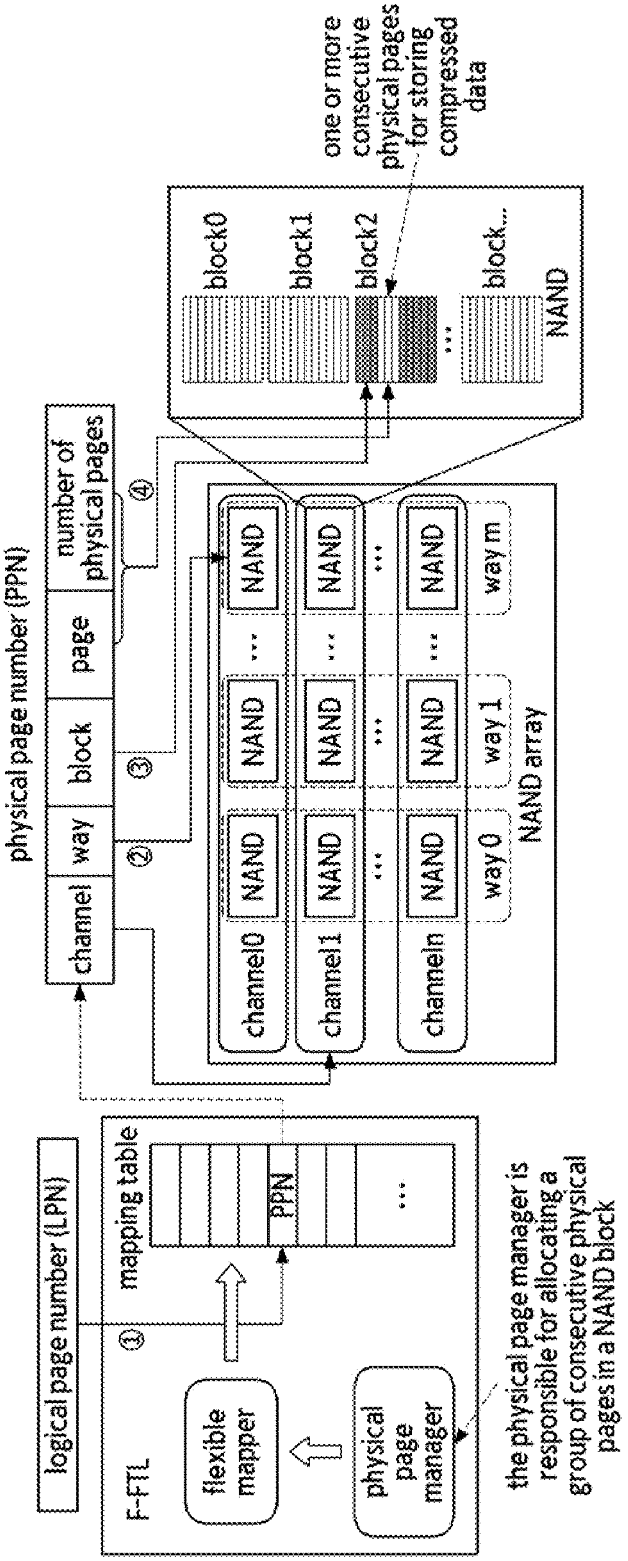
FIG. 7 illustrates a schematic diagram of an implementation process of mapping a logical page to a variable number of physical pages according to an example embodiment.

FIG. 7 illustrates a schematic diagram of an implementation process of mapping a logical page to a variable number of physical pages according to an example embodiment.

The F-FTL according to example embodiments may include three main functional modules:

A mapping table which manages mapping of a LPN to a PPN. The mapping table works in the form of a table, where each logical page corresponds to a table member and the LPN is a position of that logical page in the table. Through this mode, a PPN corresponding to the LPN may be identified. For example, the PPN may include information indicating a channel, a way, a block, a page and a number of physical pages.

A flexible mapper which allocates a required number of physical pages based on a compressed data size when writing data to the SSD, and updates the mapping table. For example, the flexible mapper may update information such as the PPN and the physical page size in the mapping table.

A physical page manager which allocates a corresponding number of consecutive physical pages in a specific NAND block according to the required number of physical pages, and generates and returns the corresponding PPN.

In a case wherein an application wants to read data of a logical page, referring to FIG. 7, a reading process is as follows:

① A corresponding PPN is identified from the mapping table through a LPN.

② A corresponding NAND chip is identified by channel information and way (column) information in the PPN.

③ A corresponding NAND block in the NAND chip is identified by block information in the PPN.

④ Data in a corresponding physical page is read from the corresponding NAND block by page information and a number of physical pages in the PPN.

Finally, the data is decompressed and passed back to the host application.

Figure 8:
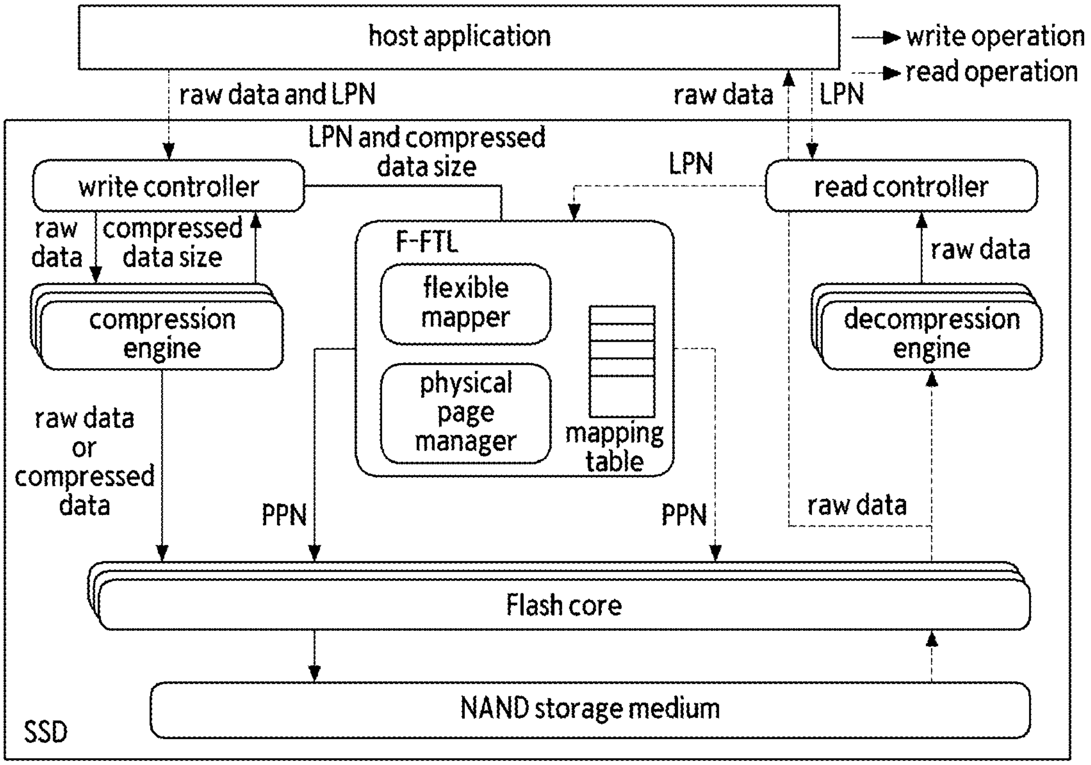
FIG. 8 illustrates an architectural diagram of a storage device according to an example embodiment.

FIG. 8 illustrates an architectural diagram of a storage device according to an example embodiment. Here, the storage device may be any one of various types of storage devices. The following describes an example in which the storage device is an SSD including the above F-FTL.

Referring to FIG. 8, the storage device may include: an F-FTL, a write controller, a read controller, a compression engine and a decompression engine, a flash memory (Flash) core, and a NAND storage medium.

The F-FTL may include a flexible mapper, a physical page manager, and a mapping table. The flexible mapper may be used to update and maintain mappings. The physical page manager may be used to allocate physical pages and generate PPNs; the physical page manager may also provide an optimized Garbage Collection (GC) function. The mapping table may be used to manage mapping between LPNs and PPNs.

The write controller may control execution of a write operation. After receiving raw data and a logical address of the host application, the compression engine is first invoked to compress the raw data of the application, and then a corresponding PPN is obtained through the F-FTL based on a LPN and a size of the compressed data, and finally a NAND write request is constructed and submitted to the Flash core for NAND write operation. The write controller may identify whether the storage space saved by the compressed data is less than one physical page. If the storage space saved by the compressed data is less than one physical page, the raw data may be stored directly to a NAND medium instead of storing the compressed data. If the storage space saved by the compressed data is not less than one physical page, the compressed data may be stored the NAND medium.

The read controller may control execution of a read operation. The PPN corresponding to the LPN may be obtained by the F-FTL, and then the compressed data or the raw data may be read from the NAND medium. If the compressed data is read, the decompression engine is invoked to decompress data from the compressed data. Finally, the raw data is returned to the host application.

The compression engine and the decompression engine may control operations for compressing and decompressing data, respectively. The compression engine and decompression engine may be a data compression engine and a data decompression engine implemented through hardware logic (i.e., circuitry) to provide high-performance data compression and decompression functions.

The Flash core is a computing core (CPU) in the SSD that is dedicated to NAND read and write operations, and may be used to perform program, read, and erase operations of the NAND.

The NAND storage medium may be a NAND array used to store data.

Figure 9:
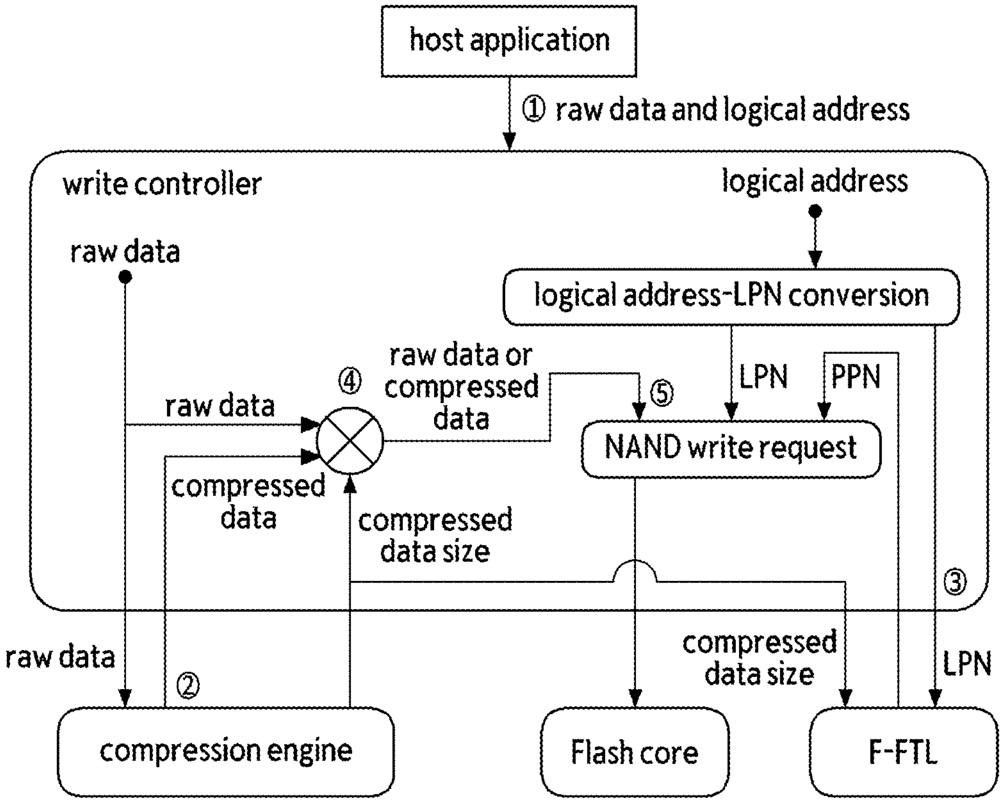
FIG. 9 illustrates a schematic diagram of a workflow of a write controller according to an example embodiment.

FIG. 9 illustrates a schematic diagram of a workflow of a write controller according to an example embodiment.

The write controller may control an entire write process. All write operations are processed in a basic unit of a logical page. For a write operation issued by a host application, a data size must be an integer multiple of a logical page size; in addition, a logical address to be written must be an integer multiple of a logical page.

Referring to FIG. 9, a basic write flow of the write controller is as follows:

① After receiving raw data and a logical address transmitted by the host application, the write controller may identify whether the raw data size or the logical address is not an integer multiple of the logical page size. If the raw data size or the logical address is not an integer multiple of the logical page size, the write operation is rejected and an error code is returned.

② If the raw data size and the logical address are integer multiples of the logical page size, the raw data is compressed through the compression engine and compressed data and a corresponding compressed data size are obtained.

③ An LPN is calculated from the logical address, and the LPN and the compressed data size is passed to the F-FTL. The F-FTL may apply for required consecutive physical pages, return corresponding PPNs, and update its internal mapping table.

④ Whether to store the compressed data or the raw data is determined based on the compressed data size. For example, it is assumed that the logical page size is N times the physical page size. If the compressed data needs to be stored in less than N physical pages, the compressed data is stored to the NAND medium; otherwise, the raw data may be written directly, e.g., if the compressed data does not save one complete physical page, the raw data may be stored directly without data compression.

Figure 10:
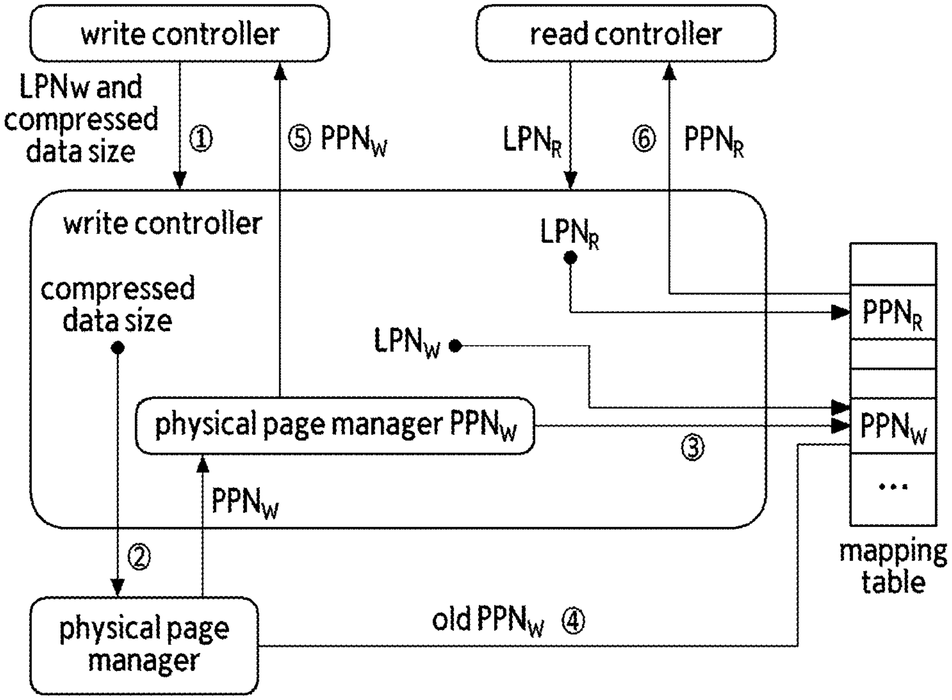
FIG. 10 illustrates a schematic diagram of a workflow of a flexible mapper according to an example embodiment.

⑤ A NAND write request is constructed using the data to be written to the NAND medium, the LPN, and the PPN, and the newly constructed write request is transmitted to the Flash core (CPU), which writes the data to the NAND medium. For example, after the Flash core receives the write request, a LPN corresponding to each physical page may be recorded in the physical page for subsequent page collecting. FIG. 10 illustrates a schematic diagram of a workflow of a flexible mapper according to an example embodiment.

The flexible mapper may provide two functions of allocating a new physical page for a write operation and updating the mapping table. If a logical page for a write operation has already been allocated a physical page, the physical page manager may be informed to release an old physical page; and to query a physical page corresponding to the logical page for a read operation.

Referring to FIG. 10, a basic workflow of the flexible mapper is as follows:

① After receiving a request for applying for a physical page from the write controller, a corresponding LPN $LPN_w$ and a compressed data size are obtained.

② A new physical page is allocated through the physical page manager based on the compressed data size and a corresponding PPN $PPN_w$ is obtained.

③ The mapping table is updated and the newly generated PPN $PPN_w$ is written to a region corresponding to the LPN $LPN_w$.

④ If a LPN to be updated has a previously allocated PPN, the physical page manager is informed to release the previously allocated physical page (i.e., the old $PPN_w$).

⑤ The new PPN $PPN_w$ is returned to the write controller.

⑥ Upon receiving a PPN require request from the read controller, a corresponding PPN $PPN_R$ is identified from the mapping table by a received LPN $LPN_R$ and returned to the read controller.

Figure 11:
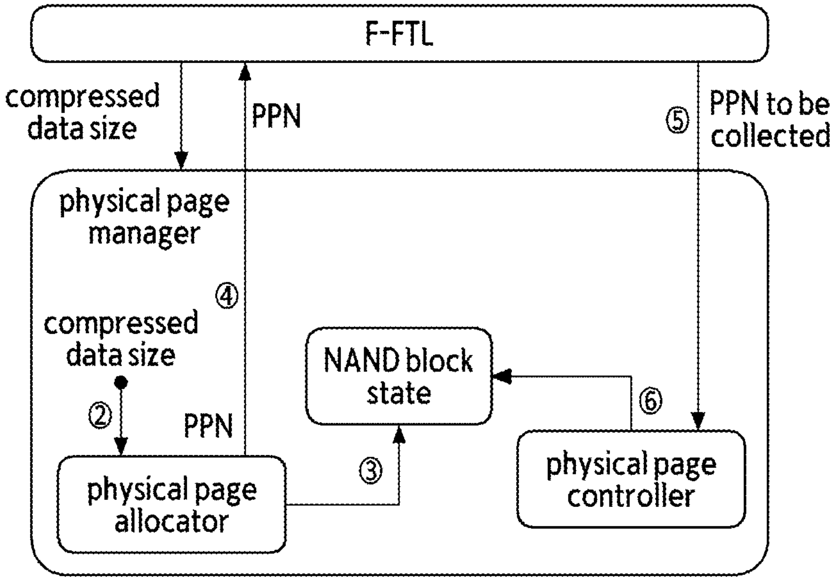
FIG. 11 illustrates a schematic diagram of a workflow of a physical page manager according to an example embodiment.

FIG. 11 illustrates a schematic diagram of a workflow of a physical page manager according to an example embodiment.

The physical page manager may control operations for applying for a physical page and collecting an old physical page. The physical page manager may include three main modules:

A physical page allocator which controls operations for applying for a specified number of consecutive physical pages.

A physical page collector which controls operations for collecting an old physical page that needs to be released and provides a NAND block for garbage collection operation. For example, when a logical page is written with new data, the physical page collector collects and releases a physical page originally corresponding to the logical page.

A NAND block state module which controls operations for recording states of all NAND blocks. For example, the NAND block state module records information indicating whether valid data exists in each physical page in a NAND block and a number of physical pages with valid data. Here, the valid data may be understood to mean that there is a mapping relationship between data stored in a physical page and data in a logical page.

Referring to FIG. 11, a workflow of the physical page manager is as follows:

① A physical page apply request which includes a compressed data size is received from the flexible mapper of the F-FTL.

② The physical page allocator identifies a NAND block with enough space (physical page) and requests a specified number of consecutive physical pages from it, and generates a PPN.

③ The NAND block state is updated and the physical pages applied in operation ② are marked as containing valid data.

④ A newly generated PPN is returned to the F-FTL flexible mapper.

⑤ A physical page release request which includes a PPN to be released/collected is received from the F-FTL mapper.

⑥ The physical page collector first updates the NAND block state and marks the physical page to be released as a dirty page, indicating that the physical page has no valid data and needs to be collected. Then the physical page collector detects whether the NAND block where the physical page to be released is located satisfies a condition for garbage collection. For example, a NAND block may be used as a basic collecting unit.

Figure 12:
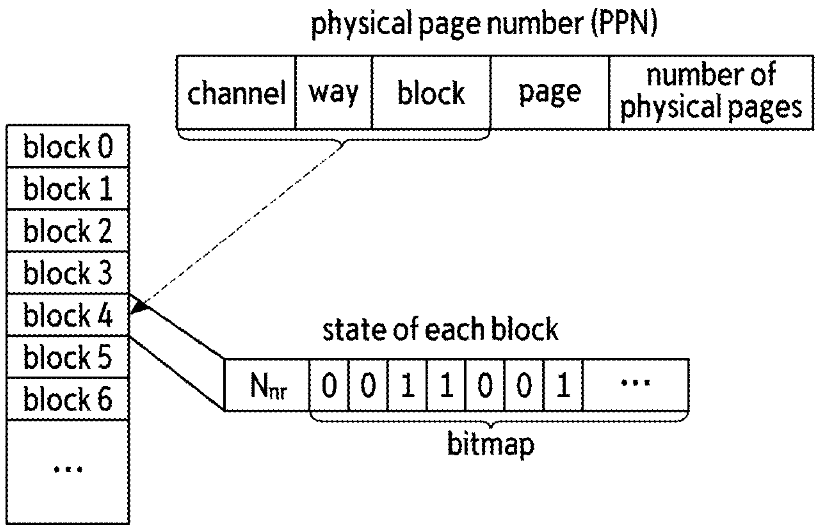
FIG. 12 illustrates a schematic diagram of a NAND block state according to an example embodiment.

FIG. 12 illustrates a schematic diagram of a NAND block state according to an example embodiment.

The NAND block state may essentially be a large array including members which represent a state structure of a NAND block. The state structure corresponding to each NAND block may be identified by using a channel, a way, and block information in a PPN.

Referring to FIG. 12, each NAND block state may save two pieces of information:

A number of valid physical pages which indicates how many physical pages containing valid data in this NAND block.

A physical page state bitmap in which each physical page may be represented using one bit. For example, a bit of 1 indicates that the physical page contains valid data, and a bit of 0 indicates that the physical page is a dirty page, i.e., waiting to be collected and released.

Figure 13:
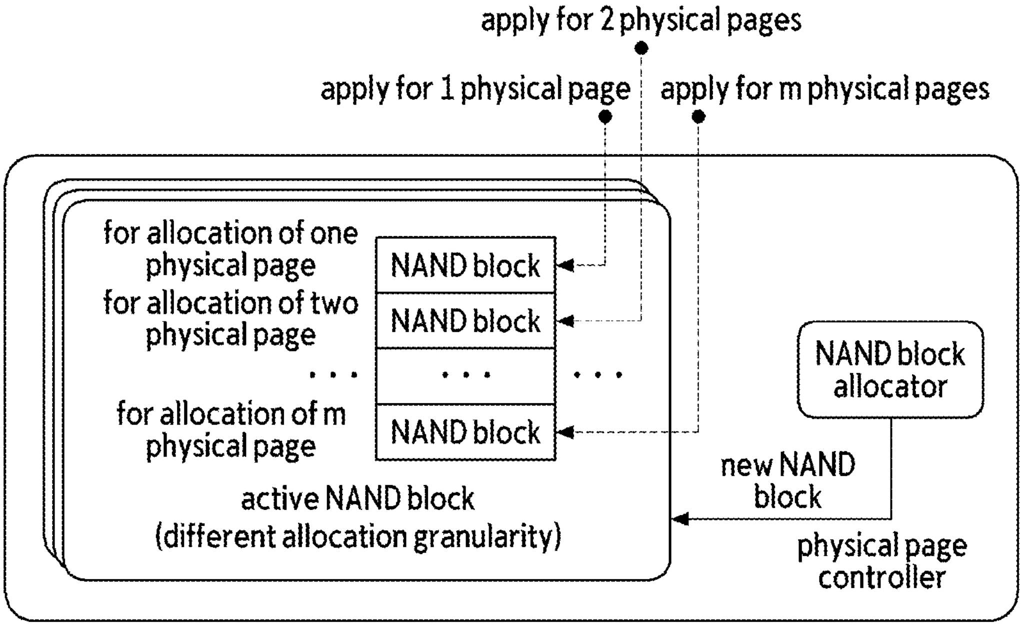
FIG. 13 illustrates a schematic diagram of a workflow of a physical page allocator according to an example embodiment.

FIG. 13 illustrates a schematic diagram of a workflow of a physical page allocator according to an example embodiment.

The physical page allocator may control operations for allocating a group of consecutive physical pages. To ensure allocation efficiency, the physical page allocator may utilize the following operations.

The physical page allocator provides a plurality of workgroups, each of which may handle applications for a different number of consecutive physical pages. This avoids resource contention caused by multiple physical page apply requests.

In each workgroup, one or a preset number of dedicated active NAND blocks are provided for each physical page applying of different granularity (a number of physical pages to be applied). For example, an active NAND block for allocation of one physical page serves only applying for a single physical page; an active NAND block for the allocation of two physical pages is only used for applying for allocating two physical pages. The above are provided as examples, and example embodiments are not limited thereto.

The NAND block allocator may allocate a new NAND block for any of the workgroups after physical pages in a certain active NAND block in the workgroup are exhausted. For example, the new NAND block may be a NAND block in which physical pages are all unused or some of the physical pages are used.

Figure 14:
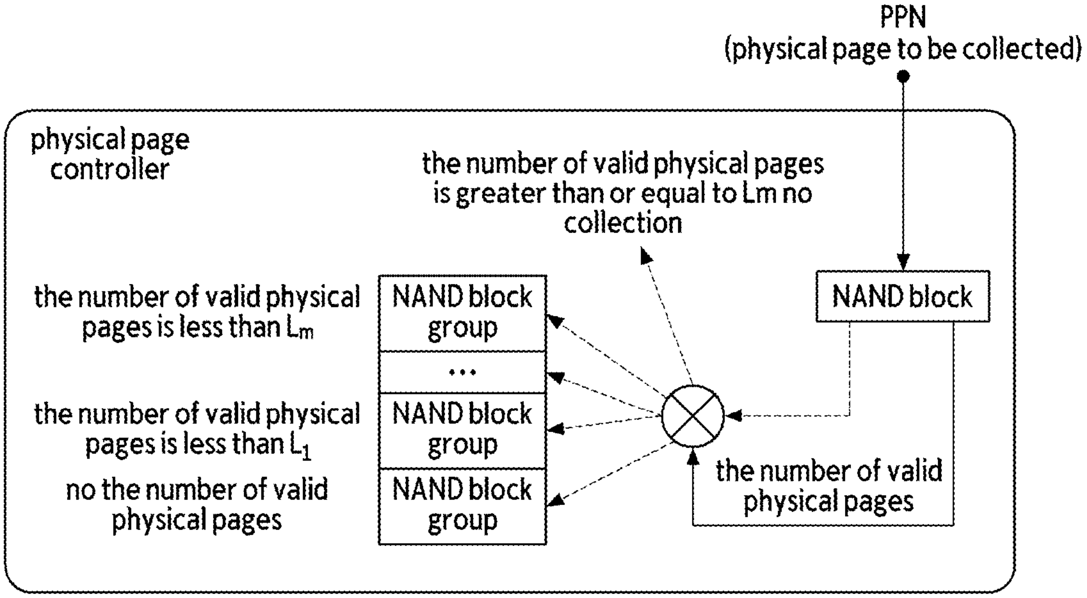
FIG. 14 illustrates a schematic diagram of a workflow of a physical page collector according to an example embodiment.

FIG. 14 illustrates a schematic diagram of a workflow of a physical page collector according to an example embodiment.

The physical page collector may control operations for marking a physical page to be collected as a dirty page, updating a number of valid physical pages of a NAND block in which a collected physical page is located, and finally placing the NAND block into different collect groups based on the number of valid physical pages owned in the NAND block.

Referring to FIG. 14, when garbage collection is required, NAND blocks are collected based on an order of the numbers of valid physical pages in the NAND blocks from least to greatest. A NAND block without valid physical pages may be collected first, and NAND blocks that satisfy the condition for garbage collection may be collected sequentially. For example, a NAND block with the number of valid physical pages greater than or equal to $L_m$ may not be collected, where $L_m$ is a preset value.

As shown in FIG. 14, after dividing the NAND blocks into a plurality of groups, such as dividing NAND blocks with no valid physical pages into a group, dividing NAND blocks with the number of valid physical pages less than Li into a group, and so on, the NAND blocks are then collected sequentially according to the divided groups. For each group, collecting may be performed sequentially according to the number of valid physical pages contained in each NAND block in the group.

Figure 15:
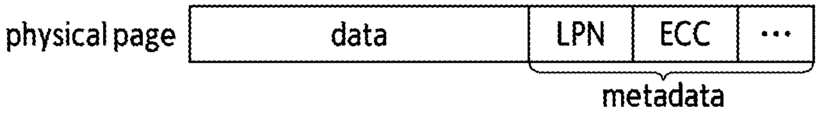
FIG. 15 illustrates a schematic diagram of a physical page data layout according to an example embodiment.

FIG. 15 illustrates a schematic diagram of a physical page data layout according to an example embodiment.

During a garbage collection operation of an SSD, there may be a small number of valid physical pages in a NAND block to be collected. When such a NAND block is collected, the physical page collector needs to copy data in these valid physical pages to other NAND blocks (such as any NAND block that may be allocated). After the data is copied/moved, a logical page-physical page mapping table needs to be updated. In metadata associated with a physical page, a LPN corresponding to that physical page is stored, and by using that LPN, the logical page-physical page mapping relationship in the mapping table of the F-FTL may be updated. In FIG. 15, ECC denotes an error correction algorithm. The data layout of the physical page shown in FIG. 15 is provided as an example, and example embodiments are not limited thereto.

According to an example embodiment, the new F-FTL enables the SSD to support a full-transparent data compression function and provide a larger storage space without introducing additional computing load (CPU) and resource requirements (memory or additional hardware). In addition, the full-transparent data compression function enables the SSD to work like the related SSD, and the host application does not need to be made any software modification or secondary development to use the SSD product.

According to an example embodiment, the asymmetric logical page-physical page mapping method (logical and physical pages are not the same size) enables the SSD to require only 40% of the memory requirement of the related SSD. The reduction in memory requirements may significantly reduce SSD complexity and improve product performance. For example, if it is assumed that a size of a logical page is 4 times that of a physical page and that the SSD provides 1.5 times a user storage space, the user may store 1.5*4 TB=6 TB of data when the NAND media may store 4 TB of data.

Figure 16:
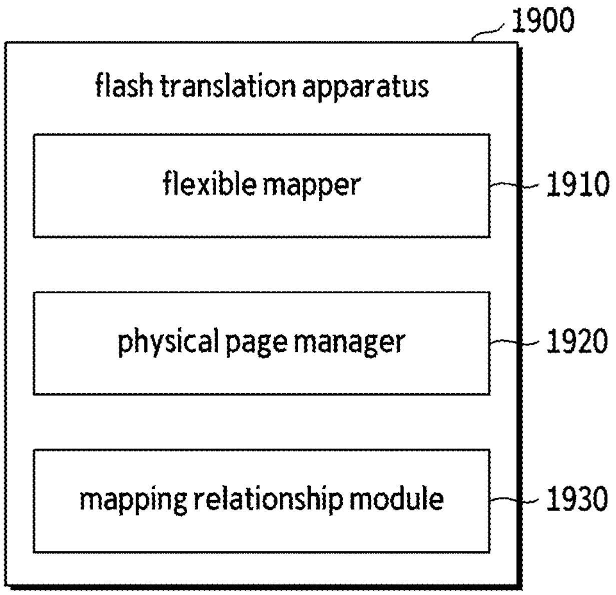
FIG. 16 illustrates a block diagram of a flash translation apparatus according to an example embodiment.

FIG. 16 illustrates a block diagram of a flash translation apparatus according to an example embodiment.

Referring to FIG. 16, the flash translation apparatus 1900 may include a flexible mapper 1910, a physical page manager 1920, and a mapping relationship module 1930. For example, the flash translation apparatus 1900 may be an FTL in an SSD. For example, the flash translation apparatus 1900 may operate independently or in conjunction with an external storage device.

The flexible mapper 1910 may identify a size of compressed data, the compressed data being obtained by compressing raw data in a logical page of a logical address space; and determine, based on the size of the compressed data, a number of physical pages of a physical address space for storing the compressed data.

A physical page manager 1920 may allocate physical pages corresponding to the number of physical pages. For example, the physical pages corresponding to the number of physical pages are allocated in a target storage block.

For example, the target storage block may be a NAND block of a solid state drive.

For example, the allocated physical pages may be consecutive physical pages in the target NAND block corresponding to the number of physical pages.

For example, a logical page may be of a different size than a physical page. For example, a size of one logical page may be an Nth power of M of that of one physical page, wherein M is a positive integer greater than or equal to 1 and N is a positive integer greater than or equal to 0, as shown with reference to FIG. 5.

For example, the physical page manager 1920 may provide a plurality of workgroups, each workgroup having a preset number of NAND blocks, each workgroup being separately used to perform an allocation operation for a different number of consecutive physical pages and the each group being capable of performing the allocation operation in parallel; select a target NAND block from a workgroup corresponding to the number of physical pages and allocate the physical pages corresponding to the number of physical pages from the target NAND block; and allocate a new NAND block to one workgroup when all of physical pages in one NAND block in the one workgroup are used, as shown in FIG. 13.

For example, the physical page manager 1920 may generate a physical page number based on the allocated physical page, and the physical page number may represent information about a location of the physical page in the physical address space, as shown in FIG. 11.

For example, the mapping relationship module 1930 may store a mapping relationship between the physical page number and a logical page number, the logical page number representing information about a location of the logical page in the logical address space, as shown in FIG. 10. The mapping relationship may be used to determine a location of a physical page corresponding to a logical page in the physical address space based on the logical page or to determine a location of a logical page corresponding to a physical page in the logical address space based on the physical page.

For example, the physical page manager 1920 may determine a number of valid physical pages for each NAND block in the solid state drive, the valid physical pages containing valid data; determine, based on the number of the valid physical pages of the NAND block, whether the NAND block satisfies a collection condition; and collect the NAND block in a case where the NAND block satisfies the collection condition, as shown in FIG. 12 and FIG. 14.

For example, the physical page manager may be configured to, in a case where there is a valid physical page in a NAND block that satisfies the collection condition: copy data in the valid physical page to a physical page in a NAND block that does not satisfy the collection condition; and generate a physical page number based on the physical page to which the data is copied, as shown in FIG. 15.

For example, the flexible mapper may be configured to: update a mapping relationship between the physical page number and a logical page number based on the physical page number, the logical page number being a logical page number previously corresponding to a physical page number generated based on the valid physical page, as shown in FIG. 10.

As an example, the flash translation apparatus 1900 may be an FTL in an SSD, and the flash translation apparatus 1900 may perform operations in accordance with the workflows illustrated in FIGS. 8 through 14.

Figure 17:
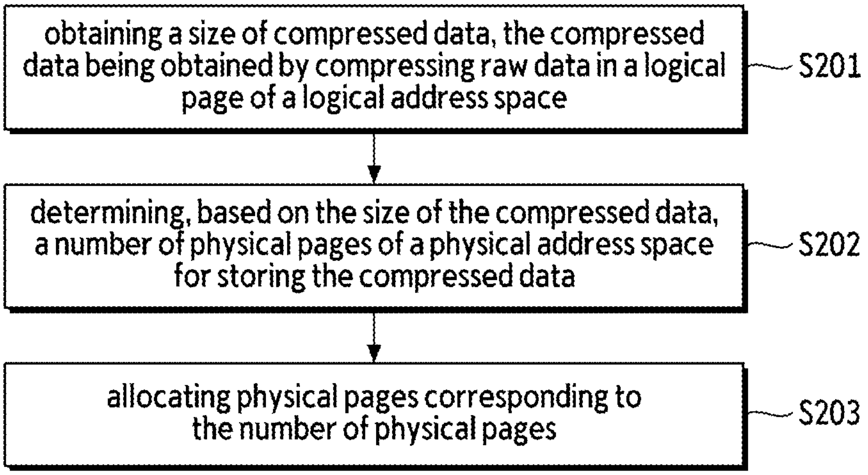
FIG. 17 illustrates a flowchart of a storage method according to an example embodiment.

FIG. 17 illustrates a flowchart of a storage method according to an example embodiment. The storage method illustrated in FIG. 17 may be performed by any one of various types of storage devices, e.g., by an SSD or an FTL of the SSD.

Referring to FIG. 17, at operation S201, a size of compressed data is obtained, the compressed data is obtained by compressing raw data in a logical page of a logical address space.

At operation S202, based on the size of the compressed data, a number of physical pages of a physical address space for storing the compressed data is determined.

At operation S203, physical pages corresponding to the number of physical pages is allocated in a target storage block.

For example, the physical pages corresponding to the number of physical pages may be allocated in a target storage block. The target storage block may be a NAND block of a solid state drive.

For example, the allocated physical pages may be consecutive physical pages in the target NAND block corresponding to the number of physical pages.

For example, a logical page may be of a different size than a physical page.

For example, a size of one logical page may be an Nth power of M of that of one physical page, wherein M is a positive integer greater than or equal to 1 and N is a positive integer greater than or equal to 0.

For example, the allocating of the physical pages corresponding to the number of physical pages in the target storage block may include: providing a plurality of workgroups, each workgroup having a preset number of NAND blocks, the each workgroup being separately used to perform an allocation operation for a different number of consecutive physical pages and the each group being capable of performing the allocation operation in parallel; and selecting a target NAND block from a workgroup corresponding to the number of physical pages and allocating the physical pages corresponding to the number of physical pages from the target NAND block.

For example, the storage method may further include: allocating a new NAND block to one workgroup when all of physical pages in one NAND block in the one workgroup are used.

For example, the storage method may further include: generating a physical page number based on the allocated physical page, the physical page number representing information about a location of the physical page in the physical address space; storing a mapping relationship between the physical page number and a logical page number, the logical page number representing information about a location of the logical page in the logical address space, wherein the mapping relationship is used to determine a location of a physical page corresponding to a logical page in the physical address space based on the logical page or to determine a location of a logical page corresponding to a physical page in the logical address space based on the physical page.

For example, the storage method may further include: determining a number of valid physical pages for each NAND block in the solid state drive, the valid physical pages containing valid data; determining, based on the number of the valid physical pages of the NAND block, whether the NAND block satisfies a collection condition; and collecting the NAND block in a case where the NAND block satisfies the collection condition.

For example, in a case where there is a valid physical page in a NAND block that satisfies the collection condition, the storage method may further include: copying data in the valid physical page to a physical page in a NAND block that does not satisfy the collection condition, e.g., copying data in the valid physical page in the NAND block that satisfies the collection condition to a physical page newly allocated from a free NAND block; generating a physical page number based on the physical page to which the data is copied; and updating a mapping relationship between the physical page number and a logical page number based on the physical page number, the logical page number being a logical page number previously corresponding to a physical page number generated based on the valid physical page.

The storage method illustrated in FIG. 17 may be referred to the workflows illustrated above as in FIGS. 8 through 14 and will not be described in detail herein.

According to example embodiments, a data compression function is integrated in the data storage process to enable users to store more data in a fixed physical storage space so as to reduce data storage resources and complexity.

The flash translation apparatus and the storage method according to example embodiments may be applied to smart SSD products and other computing storage devices that provide a full-transparent data compression function and/or require logical pages to be larger than physical pages.

Figure 18:
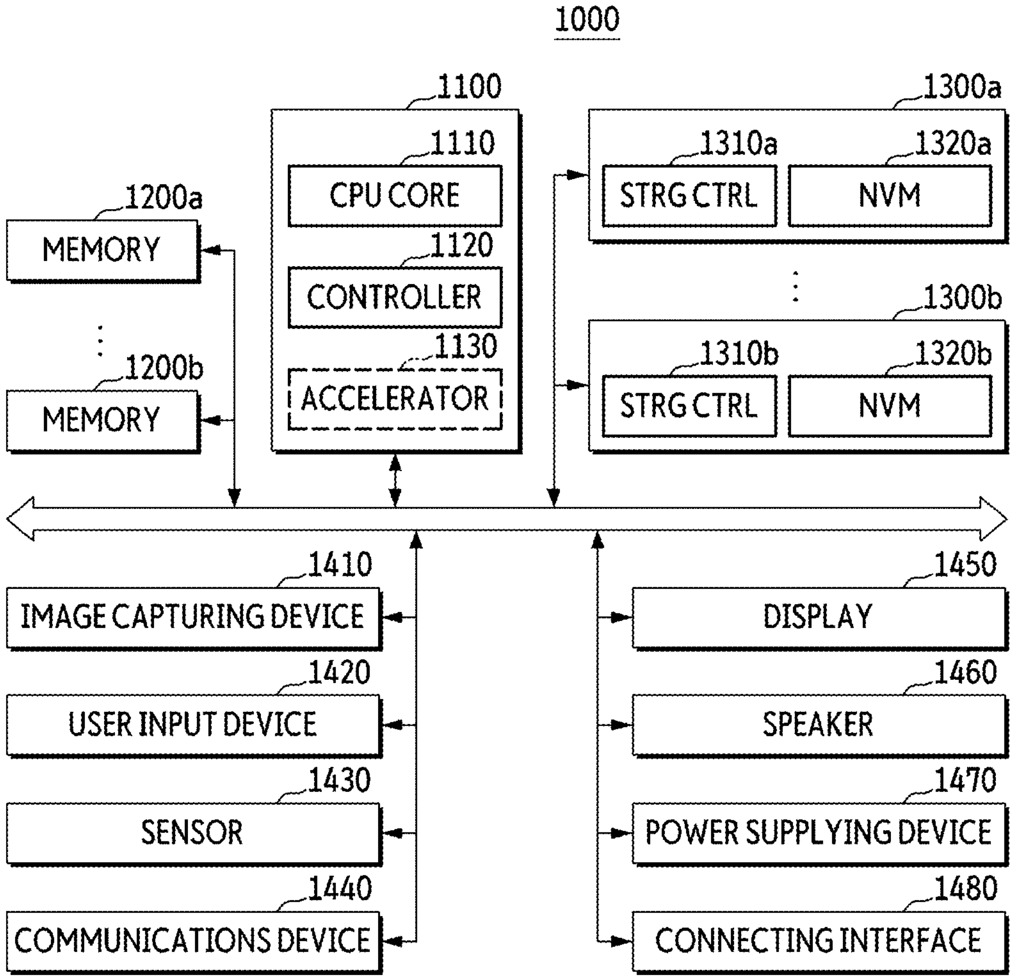
FIG. 18 is a diagram of a system to which a storage device is applied, according to an example embodiment.

FIG. 18 is a diagram of a system 1000 to which a storage device is applied, according to an example embodiment.

The system 1000 of FIG. 18 may be a mobile system, such as a portable communication terminal (e.g., a mobile phone), a smartphone, a tablet personal computer (PC), a wearable device, a healthcare device, or an Internet of things (IOT) device. However, the system 1000 of FIG. 18 is not necessarily limited to the mobile system and may be a PC, a laptop computer, a server, a media player, or an automotive device (e.g., a navigation device).

Referring to FIG. 18, the system 1000 may include a main processor 1100, memories (e.g., 1200*a* and 1200*b*), and storage devices (e.g., 1300*a* and 1300*b*). The storage devices may be configured to perform storage operations discussed above. In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200*a* and 1200*b* and/or the storage devices 1300*a* and 1300*b*. In some example embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200*a* and 1200*b* may be used as main memory devices of the system 1000. Although each of the memories 1200*a* and 1200*b* may include a volatile memory, such as static random access memory (SRAM) and/or dynamic RAM (DRAM), each of the memories 1200*a* and 1200*b* may include non-volatile memory, such as a flash memory, phase-change RAM (PRAM) and/or resistive RAM (RRAM). The memories 1200*a* and 1200*b* may be implemented in the same package as the main processor 1100.

The storage devices 1300*a* and 1300*b* may serve as non-volatile storage devices configured to store data regardless of whether power is supplied thereto, and have larger storage capacity than the memories 1200*a* and 1200*b*. The storage devices 1300*a* and 1300*b* may respectively include storage controllers (STRG CTRL) 1310*a* and 1310*b* and NVM (Non-Volatile Memory) s 1320*a* and 1320*b* configured to store data via the control of the storage controllers 1310*a* and 1310*b*. Although the NVMs 1320*a* and 1320*b* may include flash memories having a two-dimensional (2D) structure or a three-dimensional (3D) V-NAND structure, the NVMs 1320*a* and 1320*b* may include other types of NVMs, such as PRAM and/or RRAM.

The storage devices 1300*a* and 1300*b* may be physically separated from the main processor 1100 and included in the system 1000 or implemented in the same package as the main processor 1100. In addition, the storage devices 1300*a* and 1300*b* may have types of solid-state devices (SSDs) or memory cards and be removably combined with other components of the system 1000 through an interface, such as the connecting interface 1480 that will be described below. The storage devices 1300*a* and 1300*b* may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system

1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

The storage devices (e.g., 1300*a* and 1300*b*) may be SSDs. According to an example embodiment, a system (e.g., 1000), to which a storage apparatus is applied, is provided, the system includes a main processor (e.g., 1100); a memory (e.g., 1200*a* and 1200*b*); and the storage apparatus (e.g., 1300*a* and 1300*b*), wherein the storage apparatus is configured to perform storage operations discussed above. For example, the storage controller (e.g., 1310*a* or 1310*b*) may include the F-FTL, the write controller, the read controller, the compression engine and the decompression engine, the Flash core, and the NAND storage medium illustrated in FIG. 8; and perform any of the above methods or operations.

Figure 19:
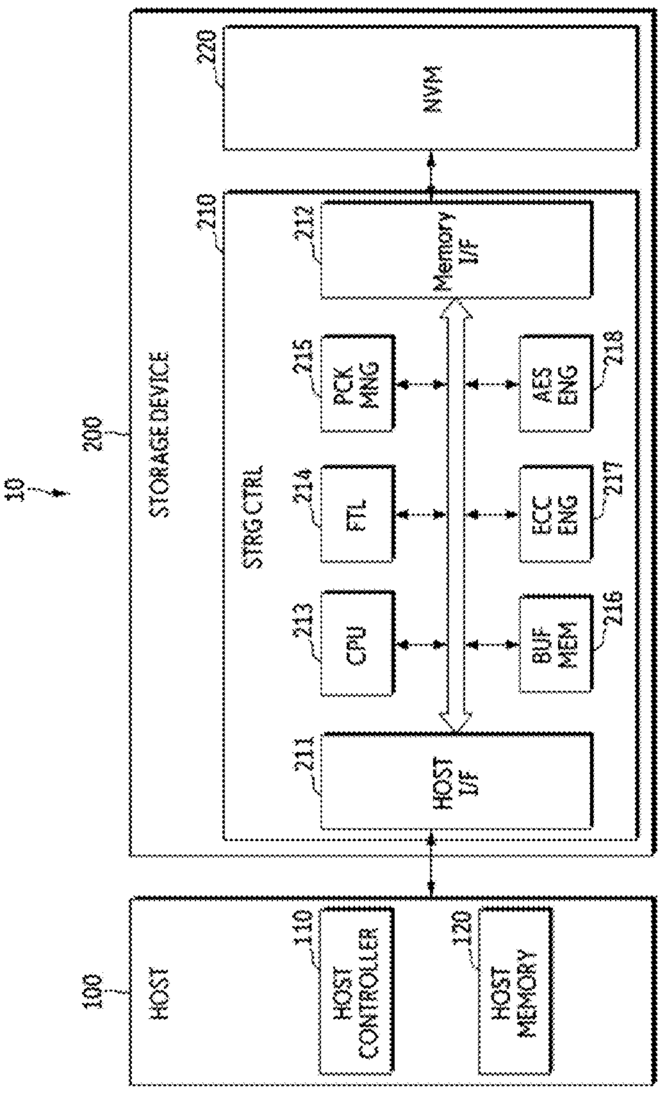
FIG. 19 is a block diagram of a host storage system according to an example embodiment.

FIG. 19 is a block diagram of a host storage system 10 according to an example embodiment.

The host storage system 10 may include a host 100 and a storage device 200. The storage device 200 may be configured to perform storage operations discussed above. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an example embodiment, the host controller 110 and the host memory 120 may be implemented as separate semiconductor chips. Alternatively, in some example embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controllers 210 may further include a flash translation layer (FTL) 214, a packet manager 215, a buffer memory 216, an error correction code (ECC) engine 217, and an advanced encryption standard (AES) engine 218. The storage controllers 210 may further include a working memory in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

The storage device 200 may be a SSD. According to an example embodiment, a host storage system (e.g., 10) is provided, the host storage system includes a host (e.g., 100); and a storage apparatus (200), wherein the storage apparatus is configured to perform storage operations discussed above. For example, the storage controller 210 may include the F-FTL, the write controller, the read controller, the compression engine and the decompression engine, the Flash core, and the NAND storage medium illustrated in FIG. 8; and perform any of the above methods or operations.

Figure 20:
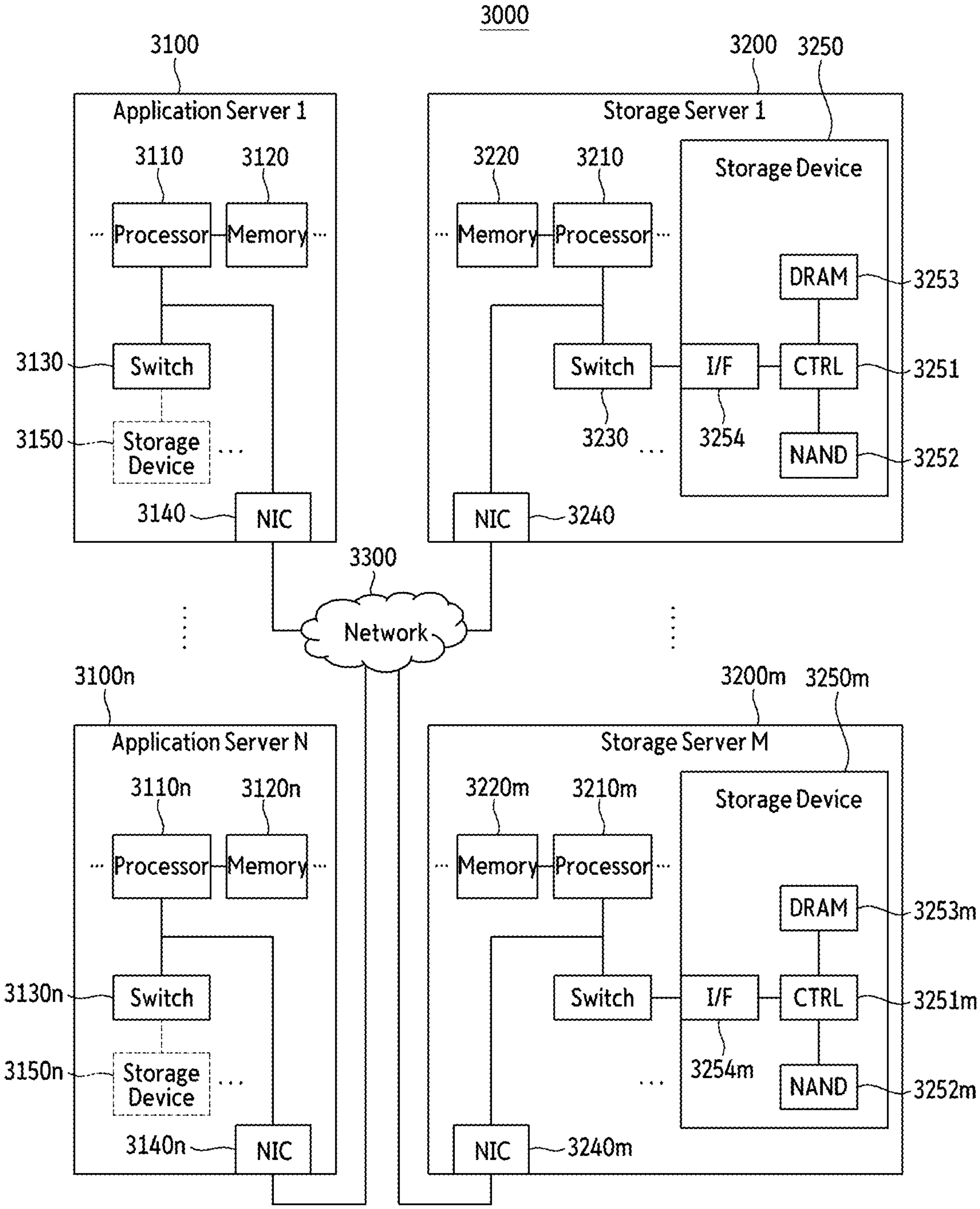
FIG. 20 is a diagram of a data center to which a memory device is applied, according to an example embodiment.

FIG. 20 is a diagram of a data center 3000 to which a memory device is applied, according to an example embodiment.

Platform Portion—Server (Application/Storage)

Referring to FIG. 20, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100*n* and storage servers 3200 to 3200*m*. The number of application servers 3100 to 3100*n* and the number of storage servers 3200 to 3200*m* may be variously selected according to example embodiments. The number of application servers 3100 to 3100*n* may be different from the number of storage servers 3200 to 3200*m*.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some example embodiments, the numbers of processors 3210 and memories 3220 included in the storage server 3200 may be variously selected. In an example embodiment, the processor 3210 and the memory 3220 may provide a processor-memory pair. In an example embodiment, the number of processors 3210 may be different from the number of memories 3220. The processor 3210 may include a single-core processor or a multi-core processor. The above description of the storage server 3200 may be similarly applied to the application server 3100. In some example embodiments, the application server 3100 may not include a storage device 3150. The storage server 3200 may include at least one storage device 3250. The number of storage devices 3250 included in the storage server 3200 may be variously selected according to example embodiments.

Platform Portion—Network

The application servers 3100 to 3100*n* may communicate with the storage servers 3200 to 3200*m* through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200*m* may be provided as file storages, block storages, or object storages according to an access method of the network 3300.

In an example embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another example embodiment, the network 3300 may be a general network, such as a TCP/IP network. For example, the network 3300 may be implemented according to a protocol, such as FC over Ethernet (FCOE), network attached storage (NAS), and NVMe over Fabrics (NVMe-oF).

Hereinafter, the application server 3100 and the storage server 3200 will mainly be described. A description of the application server 3100 may be applied to another application server 3100*n*, and a description of the storage server 3200 may be applied to another storage server 3200*m*.

The application server 3100 may store data, which is requested by a user or a client to be stored, in one of the storage servers 3200 to 3200*m* through the network 3300. Also, the application server 3100 may obtain data, which is requested by the user or the client to be read, from one of the storage servers 3200 to 3200*m* through the network 3300. For example, the application server 3100 may be implemented as a web server or a database management system (DBMS).

The application server 3100 may access a memory 3120*n* or a storage device 3150*n*, which is included in another application server 3100*n*, through the network 3300. Alternatively, the application server 3100 may access memories 3220 to 3220*m* or storage devices 3250 to 3250*m*, which are included in the storage servers 3200 to 3200*m*, through the network 3300. Thus, the application server 3100 may perform various operations on data stored in application servers 3100 to 3100*n* and/or the storage servers 3200 to 3200*m*. For example, the application server 3100 may execute an instruction for moving or copying data between the application servers 3100 to 3100*n* and/or the storage servers 3200 to 3200*m*. In this case, the data may be moved from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*. The data moved through the network 3300 may be data encrypted for security or privacy.

Organic Relationship—Interface Structure/Type

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC (Network InterConnect) 3240. The switch 3230 may selectively connect the processor 3210 to the storage device 3250 or selectively connect the NIC 3240 to the storage device 3250 via the control of the processor 3210.

In an example embodiment, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an example embodiment, the NIC 3240 may be integrated with at least one of the processor 3210, the switch 3230, and the storage device 3250.

Organic Relationship—Interface Operation

In the storage servers 3200 to 3200*m* or the application servers 3100 to 3100*n*, a processor may transmit a command to storage devices 3150 to 3150*n* and 3250 to 3250*m* or the memories 3120 to 3120*n* and 3220 to 3220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150*n* and 3250 to 3250*m* may transmit a control signal and a command/address signal to NAND flash memory devices 3252 to 3252*m* in response to a read command received from the processor. Thus, when data is read from the NAND flash memory devices 3252 to 3252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

Product Portion—SSD Basic Operation

The controller 3251 may control all operations of the storage device 3250. In an example embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210*m* of another storage server 3200*m*, or the processors 3110 and 3110*n* of the application servers 3100 and 3100*n*. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

The storage device 3250 may be a SSD. According to an example embodiment, a data center system (e.g., 3000) is provided, the data center system includes a plurality of application servers (3100 to 3100*n*); and a plurality of storage servers (e.g., 3200 to 3200*m*), wherein each storage server includes a storage apparatus 200, wherein the storage apparatus 200 is configured to perform storage operations discussed above. For example, the controller 3251 may include the F-FTL, the write controller, the read controller, the compression engine and the decompression engine, the Flash core, and the NAND storage medium illustrated in FIG. 8; and perform any of the above methods or operations.

According to an example embodiment, a computer readable storage medium having a computer program stored thereon is provided, wherein the computer program when executed by a processor implements storage operations discussed above.

According to an example embodiment, there is provided an electronic device including: a processor; a memory storing a computer program that, when the computer program is executed by the processor, implements storage operations discussed above.

According to an example embodiment, a computer readable storage medium storing instructions is also provided, wherein the instructions, when executed by at least one processor, causes the at least one processor to perform storage operations discussed above according to example embodiments. Examples of computer-readable storage media herein include: Read Only Memory (ROM), Random Access Programmable Read Only Memory (RAPROM), Electrically Erasable Programmable Read Only Memory (EEPROM), Random Access Memory (RAM), Dynamic Random Access Memory (DRAM), Static Random Access Memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blue-ray or optical disk storage, Hard Disk Drive (HDD), Solid State Drive (SSD), card storage (such as multimedia cards, secure digital (SD) cards or extremely fast digital (XD) cards), magnetic tapes, floppy disks, magneto-optical data storage devices, optical data storage devices, hard disks, solid state disks, and any other devices that are configured to store computer programs and any associated data, data files and data structures in a non-transitory manner and provide the computer programs and any associated data, data files and data structures to a processor or computer so that the processor or computer can execute the computer programs. The computer programs in the computer-readable storage medium described above may be executed in an environment deployed in a computer device, such as client, host, proxy device, server, etc. In addition, in one example, the computer programs and any associated data, data files, and data structures are distributed on a networked computer system, so that the computer programs and any associated data, data files, and data structures are stored, accessed and executed through one or more processors or computers in a distributed manner.

The terms "first", "second", "third", "fourth", "1st", "2nd", etc. (if present) used in the specification and claims and the accompanying drawings above are used to distinguish similar objects and are not necessary for describing a particular order or sequence. It should be understood that the data so used is interchangeable in appropriate cases so that example embodiments described herein may be implemented in an order other than that illustrated or described herein.

It should be understood that while the flowcharts of indicate individual operations by arrows, the order of these operations is not limited to the order indicated by the arrows. Unless explicitly stated herein, in some implementation scenarios the operations in the respective flowcharts may be performed in other orders. In addition, some or all of the operations in each flowchart may include multiple sub-operations or multiple stages based on actual implementation scenarios. Some or all of these sub-operations or stages may be executed at the same moment, and each of these sub-operations or stages may also be executed separately at different moments. In the scenarios where the execution moments are different, the order of execution of these sub-operations or stages may be flexibly configured according to the needs, and example embodiments are not limited thereto.

While aspects of example embodiments have been particularly shown and described, it will be understood that various changes in form and details may be made therein without departing from the spirit and scope of the following claims.

What is claimed is:

1. A storage device comprising:
a nonvolatile memory device configured to provide a physical address space; and
at least one processor configured to implement:
a flexible mapper configured to:
obtain a size of compressed data, the compressed data being obtained by compressing raw data in a logical page of a logical address space, wherein the raw data is received from a host; and
determine, based on the size of the compressed data, a first number of physical pages of the physical address space for storing the compressed data;
a physical page manager configured to allocate physical pages corresponding to the first number of physical pages; and
a write controller configured to:
based on the first number of physical pages of the physical address space for storing the compressed data being at least one complete physical page less than a second number of physical pages required for storing the raw data, write the compressed data to the physical pages allocated by the physical page manager; and
based on the first number of physical pages not being at least one complete physical page less than the second number of physical pages, write the raw data to the physical pages.

2. The storage device according to claim 1, wherein the nonvolatile memory device comprises a solid state drive, and
wherein the physical pages are allocated in a NAND block of the solid state drive.

3. The storage device according to claim 1, wherein the allocated physical pages are consecutive physical pages of the nonvolatile memory device.

4. The storage device according to claim 1, wherein a size of the logical page is different from that of a first physical page in the physical address space.

5. The storage device according to claim 4, wherein the size of the logical page is an Nth power of M times larger than that of the first physical page, and
wherein M is a positive integer greater than or equal to 2 and N is a positive integer greater than or equal to 1.

6. The storage device according to claim 1, wherein the physical page manager is further configured to:
provide a plurality of workgroups, each of the plurality of workgroups having a preset number of NAND blocks, each of the plurality of workgroups being separately used to perform an allocation operation for a different number of consecutive physical pages, and the plurality of workgroups being capable of performing the allocation operation in parallel;
select a target NAND block from a workgroup, among the plurality of workgroups, based on the first number of physical pages;
allocate the physical pages from the target NAND block based on the first number of physical pages; and
allocate a new NAND block to one of the plurality of workgroups based on all physical pages in one NAND block in the workgroup being used.

7. The storage device according to claim 1, wherein the physical page manager is further configured to generate a physical page number based on an allocated physical page, the physical page number representing information about a location of a physical page in the physical address space, and
wherein the at least one processor is further configured to implement a mapping relationship module configured to store a mapping relationship between the physical page number and a logical page number, the logical page number representing a location of the logical page in the logical address space.

8. The storage device according to claim 1, wherein the nonvolatile memory device comprises a solid-state drive (SSD) comprising a plurality of NAND blocks, and
wherein the physical page manager is further configured to:
identify a number of valid physical pages which contain valid data for each of the plurality of NAND blocks;
identify, for a NAND block of the plurality of NAND blocks, whether the NAND block satisfies a collection condition based on the number of valid physical pages of the NAND block; and
collect the NAND block based on the NAND block satisfying the collection condition.

9. The storage device according to claim 8, wherein the physical page manager is further configured to, based on the NAND block satisfying the collection condition:
copy data in a valid physical page to a physical page in a NAND block that does not satisfy the collection condition; and
generate a physical page number based on the physical page to which the data is copied, and
wherein the flexible mapper is further configured to update a mapping relationship between the physical page number and a logical page number.

10. A storage method comprising:
obtaining a size of compressed data, the compressed data being obtained by compressing raw data in a logical page of a logical address space, wherein the raw data is received from a host;
determining, based on the size of the compressed data, a first number of physical pages of a physical address space provided by a nonvolatile memory device for storing the compressed data;
allocating physical pages corresponding to the first number of physical pages;
based on the first number of physical pages of the physical address space for storing the compressed data being at least one complete physical page less than a second number of physical pages required for storing the raw data, writing the compressed data to the physical pages allocated by a physical page manager; and
based on the first number of physical pages not being at least one complete physical page less than the second number of physical pages, writing the raw data to the physical pages.

11. The storage method according to claim 10, wherein the nonvolatile memory device includes a solid state drive, and wherein the allocating comprises allocating the physical pages in a NAND block of the solid state drive.

12. The storage method according to claim 10, wherein the allocated physical pages are consecutive physical pages of the nonvolatile memory device.

13. The storage method according to claim 10, wherein a size of the logical page is different from that of a first physical page in the physical address space.

14. The storage method according to claim 13, wherein the size of the logical page is an Nth power of M times larger than that of the first physical page, and wherein M is a positive integer greater than or equal to 2 and N is a positive integer greater than or equal to 1.

15. The storage method according to claim 10, wherein the allocating of the physical pages corresponding to the first number of physical pages comprises:

providing a plurality of workgroups, each of the plurality of workgroups having a preset number of NAND blocks, each of the plurality of workgroups being separately used to perform an allocation operation for a different number of consecutive physical pages, and the plurality of workgroups being capable of performing the allocation operation in parallel;

selecting a target NAND block from a workgroup, among the plurality of workgroups, based on the first number of physical pages; and allocating the physical pages from the target NAND block based on the first number of physical pages, and wherein the storage method further comprises allocating a new NAND block to one of the plurality of workgroups based on all physical pages in one NAND block in the workgroup being used.

16. The storage method according to claim 10, wherein the storage method further comprises:

generating a physical page number based on an allocated physical page, the physical page number representing information about a location of a physical page in the physical address space; and storing a mapping relationship between the physical page number and a logical page number, the logical page number representing a location of the logical page in the logical address space.

17. The storage method according to claim 10, wherein the nonvolatile memory device comprises a solid-state drive (SSD) comprising a plurality of NAND blocks, and wherein the storage method further comprises:

identifying a number of valid physical pages which contain valid data for each of the plurality of NAND blocks;

identifying, for a NAND block of the plurality of NAND blocks, whether the NAND block satisfies a collection condition based on the number of valid physical pages of the NAND block; and collecting the NAND block based on the NAND block satisfying the collection condition.

18. The storage method according to claim 17, wherein the storage method further comprises:

copying, based on the NAND block satisfying the collection condition, data in a valid physical page to a physical page in a NAND block that does not satisfy the collection condition;

generating a physical page number based on the physical page to which the data is copied; and updating a mapping relationship between the physical page number and a logical page number.

19. A non-transitory computer readable storage medium having a computer program stored thereon, wherein the computer program, when executed by a processor, is configured to control a storage device to perform a method including:

obtaining a size of compressed data, the compressed data being obtained by compressing raw data in a logical page of a logical address space, wherein the raw data is received from a host;

determining, based on the size of the compressed data, a first number of physical pages of a physical address space provided by a nonvolatile memory device for storing the compressed data;

allocating physical pages corresponding to the first number of physical pages;

based on the first number of physical pages of the physical address space for storing the compressed data being at least one complete physical page less than a second number of physical pages required for storing the raw data, writing the compressed data to the physical pages allocated by a physical page manager; and based on the first number of physical pages not being at least one complete physical page less than the second number of physical pages, writing the raw data to the physical pages.

20. The non-transitory computer readable storage medium according to claim 19, wherein a size of the logical page is different from that of a first physical page in the physical address space, wherein the size of the logical page is an Nth power of M times larger than that of the first physical page, and wherein M is a positive integer greater than or equal to 2 and N is a positive integer greater than or equal to 1.

* * * * *